(12) United States Patent
Chen et al.

(10) Patent No.: US 7,277,732 B2
(45) Date of Patent: Oct. 2, 2007

(54) LANGUAGE INPUT SYSTEM FOR MOBILE DEVICES

(75) Inventors: Zheng Chen, Beijing (CN); Mingjing Li, Beijing (CN); Feng Zhang, Beijing (CN); Rui Yang, Beijing (CN); Jianfeng Gao, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1216 days.

(21) Appl. No.: 09/843,358

(22) Filed: Apr. 24, 2001

(65) Prior Publication Data

US 2002/0045463 A1   Apr. 18, 2002

Related U.S. Application Data

(60) Provisional application No. 60/240,584, filed on Oct. 13, 2000.

(51) Int. Cl.
*A04B 1/38* (2006.01)

(52) U.S. Cl. .................. 455/566; 455/575.1; 704/3; 379/433.07; 345/469

(58) Field of Classification Search ............ 455/550.1, 455/566, 575.1; 379/368, 433.07, 433.01, 379/433.06; 345/471, 472.3, 467–469; 704/2, 704/3, 231, 251
See application file for complete search history.

(56) References Cited

U.S. PATENT DOCUMENTS

| | | | | |
|---|---|---|---|---|
| 4,531,119 A * | 7/1985 | Nakayama et al. | .......... | 345/171 |
| 5,838,972 A * | 11/1998 | Matsuzuka et al. | .......... | 719/332 |
| 5,987,447 A * | 11/1999 | Chang et al. | .................. | 707/3 |
| 6,005,495 A * | 12/1999 | Connolly et al. | ............. | 341/22 |
| 6,009,444 A * | 12/1999 | Chen | .......................... | 715/535 |
| 6,014,615 A * | 1/2000 | Chen | .............................. | 704/3 |
| 6,246,976 B1 * | 6/2001 | Mukaigawa et al. | ........... | 704/9 |
| 6,272,464 B1 * | 8/2001 | Kiraz et al. | ................. | 704/257 |
| 6,292,772 B1 * | 9/2001 | Kantrowitz | .................... | 704/9 |
| 6,307,541 B1 * | 10/2001 | Ho et al. | ...................... | 345/171 |
| 6,489,950 B1 * | 12/2002 | Griffin et al. | ............... | 345/168 |
| 6,636,163 B1 * | 10/2003 | Hsieh | .......................... | 341/28 |
| 6,674,372 B1 * | 1/2004 | Ouyang | ....................... | 341/28 |
| 6,686,852 B1 * | 2/2004 | Guo | ............................ | 341/22 |
| 7,165,019 B1 * | 1/2007 | Lee et al. | ...................... | 704/2 |
| 2001/0044724 A1 * | 11/2001 | Hon et al. | ................... | 704/260 |

OTHER PUBLICATIONS

Jelinek, Frederick, *Statistical Methods for Speech Recognition*, Massachusetts Institute of Technology, 1997.
Lee, Kai-Fu, *Automatic Speech Recognition: The Development of the SPHINX System*, Kluwer Academic Publishers, 1989.

* cited by examiner

*Primary Examiner*—Edward F. Urban
*Assistant Examiner*—Nhan T. Le
(74) *Attorney, Agent, or Firm*—Lee & Hayes, PLLC

(57) ABSTRACT

A language system facilitates entry of an input string into a mobile device using discrete keys on a keypad, such as a 10-key keypad. The numeric keys have associated letters of an alphabet. The key input is representative of one or more Chinese phonetic characters. Based on this input string, the language system derives the most likely Chinese corresponding language characters intended by the user. The language system uses multiple different search engines and language models to aid in deriving the most probable Chinese language characters. When the language system recognizes possible Chinese language characters, the mobile device displays the possible Chinese language characters for user selection of the possible Chinese language characters and/or further input of one or more Chinese phonetic characters. In this manner, the language system adopts a modeless entry methodology that eliminates conventional mode switching between input and selection operations.

6 Claims, 4 Drawing Sheets

LANGUAGE INPUT SYSTEM FOR MOBILE DEVICES

RELATED APPLICATIONS

This non-provisional utility application claims priority to the provisional application number 60/240,584 entitled "Pinyin Input Method in Mobile Devices and Application of Class-Based Dynamic Dictionary in Chinese Pinyin Input System," filed on Oct. 13, 2000 by Zheng Chen, Feng Zhang, Rui Yang, Kai-Fu Lee, Mingjing Li and JianFeng Gao, and commonly assigned to the assignee of the present invention.

TECHNICAL FIELD

This invention relates to systems and methods for inputting a phonetic text (e.g., Chinese Pinyin) into a mobile device and converting the phonetic text to a language text (e.g., Chinese Hanzi).

BACKGROUND

Character-based languages (e.g., Chinese, Japanese, Korean, etc.) have thousands of characters, making it difficult for users to enter the intended characters or words into computers or electronic devices. Language specific keyboards do not exist for the simple fact that it is practically impossible to build a keyboard to support separate keys for so many different characters.

Accordingly, users typically employ a small character-set keyboard (e.g., an English QWERTY keyboard) to enter phonetic text and then word processing software converts the phonetic text to the appropriate language text of a character-based language. "Phonetic text" represents the sounds made when speaking a given language, whereas the "language text" represents the actual written characters as they appear in the text. In the Chinese language, for example, Pinyin is an example of phonetic text and Hanzi is an example of the language text. Typically, the set of characters needed to express the phonetic text is much smaller than the character set used to express the language text.

While the entry of phonetic text is difficult on small character-set keyboards, the problem is exacerbated when moving to mobile devices that are commonly equipped with input mechanisms with fewer keys. For instance, a cellular phone commonly has only eight keys to represent all 26 English letters. As a result, attempting to enter phonetic text, such as Chinese Pinyin, into a cellular phone using only a few keys can be very confusing. From a language processing perspective, the problem is twofold. First, an input system must recognize with confidence one or more possible syllables of approximately 406 syllables from a string of numbers entered using eight keys 2-9 on a common 10-key keypad. Inputting, for example, the single letter "z" might require a user to type "9999" in some products. Entering two or three characters without error in an effort to enter an intended syllable can therefore pose problems. It is noted that this problem also exists for input of English characters on mobile phone.

Second, the system must map the recognized syllable candidates to one or more than 6,000 common Chinese characters. Syllable to character conversion is a very difficult process, even for large-scale computers with substantial processing capabilities. The problem is made more difficult in the context of a limited-resource computing environment, such as a mobile phone.

Given these problems, there is a continuing need for new methods that allow a user to enter phonetic characters (e.g., Pinyin) into a mobile device with as few keys as possible, and then automatically choose the most likely language character (e.g., Hanzi character) that the user intended.

SUMMARY

A language system facilitates entry of an input string into a mobile device (e.g., cellular phones, PDAs, pagers, etc.) using discrete keys on a keypad, such as a 10-key keypad. The keys have associated letters of an alphabet (e.g., an English alphabet). The key input is representative of one or more phonetic characters (e.g., Chinese Pinyin).

Based on this input string, the language system derives the most likely corresponding language characters (e.g., Chinese Hanzi) intended by the user. The language system uses multiple different search engines and language models to aid in deriving the most probable characters. The language system includes a sentence-based search engine and an N-gram language model that statistically derives language characters based on the phonetic characters and their context within the sentence. The language system also includes a direct key-based search engine that generates the language characters based on a key sequence entered on the keypad in lieu of converting the phonetic characters to the language characters. Surname and first name language models are also used to detect proper surnames and first names in the input string.

When the language system recognizes possible language characters, the mobile device displays the possible language characters for user selection. The available choices are indexed by specifically chosen selection keys that represent letters of the alphabet that do not commonly follow the phonetic characters already entered. Thus, if the user presses a selection key used to index the language characters, the language system understands that action as a selection of the language character. Alternatively, if the user presses a non-selection key, the language system understands that action as requesting further input. In this manner, the system adopts a modeless entry methodology that eliminates conventional mode switching between input and selection operations.

Furthermore, the system can be configured to suggest some possible characters that match the input strings (e.g., when the input is incomplete) based on the language model. Then, the user can choose the desired characters from the candidate list instead of typing the complete Pinyin strings. This feature is referred to as "auto association" and can be combined with the modeless entry methodology to improve typing speed.

DETAILED DESCRIPTION

A system facilitates entry of an input string into a mobile device using discrete keys on a keypad that is representative of one or more phonetic characters. Based on this input string, the system derives the most likely corresponding language text intended by the user. The system employs a modeless entry methodology that eliminates conventional mode switching between input and selection operations.

The system is described in the context of the Chinese language, although the principles are relevant to other languages. More specifically, the system allows a user to enter via the keypad numeric strings that are representative of Pinyin characters (i.e., phonetic text). The system then derives the most likely Hanzi characters (i.e., language text) from the input string.

Generally, the mobile device is a compact, lightweight electronics device. It includes electronics (e.g., microprocessor, ASIC, etc.), memory, and a power source (e.g., battery). The mobile device is equipped with a keypad, such as a 10-key numeric keypad, that utilizes less than 26 keys to represent the 26 letters of the English alphabet. For instance, it is common to use eight keys on the numeric keypad to represent the 26 English letters. The mobile device is also equipped with a limited size display, such as an LCD screen.

For discussion purposes, the mobile device is embodied as a cellular phone. However, other mobile devices may be used to implement the system, including such devices as portable digital assistants (PDAs), handheld computers, pagers, game devices, and the like.

Exemplary Mobile Device

Figure 1:
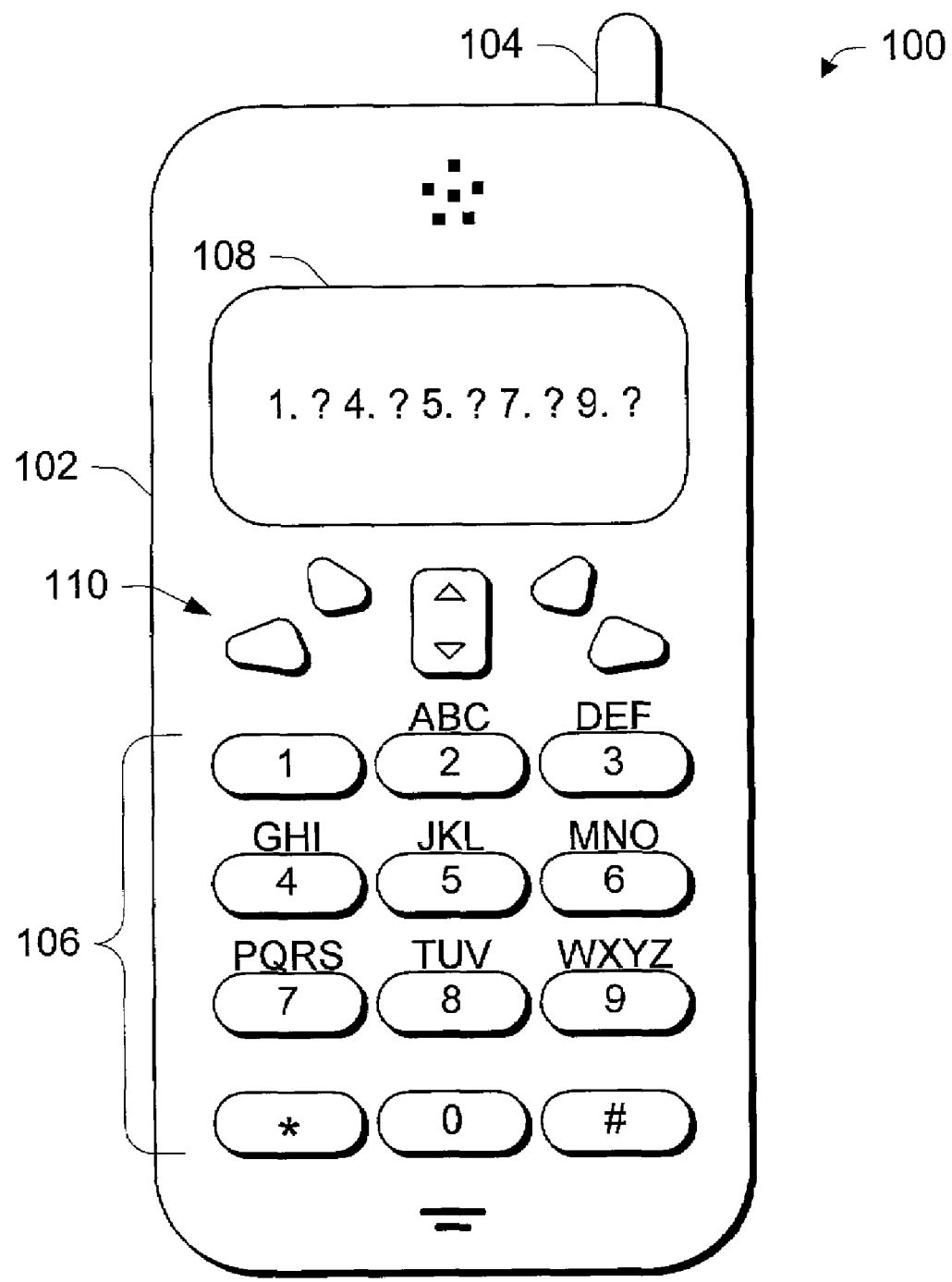
FIG. 1 illustrates a mobile phone that is equipped with a language input system.

FIG. 1 shows a mobile phone 100 as one possible implementation of a mobile device. The phone 100 includes a body 102, an antenna 104, a keypad 106, and a display 108. In this illustration, the keypad 106 is implemented as a 10-key numeric keypad. Additional control and navigation keys 110 are positioned above the keypad 106.

Letters can be entered into the mobile phone 100 via numeric keys 2 through 9. For example, letters A, B, and C can be entered using key 2, letters D, E, and F can be entered using key 3, and so forth. There are different ways to enter a desired letter. One approach is to depress the key associated with the letter and let the phone 100 (alone or in conjunction with another device(s)) attempt to automatically identify the intended letter. For example, upon pressing the "5" key, the phone 100 attempts to determine which of the letters "J", "K", or "L" was intended, such as based on the preceding inputs.

Another approach is to depress the same key one or more times to identify a specific letter associated with the key. For example, to enter the letter "N", a user presses the "6" key two times. To enter the letter "I", a user presses the "4" key three times. Yet another approach is to press a number key to identify the set of 3 or 4 letters, and then press number keys 1-4 to select the specific letter. For example, to enter the letter "N" with this approach, the user presses the "6" key to identify the letters "MNO" and then presses the "2" key to select the letter "N" as the second letter in that series.

Figure 2:
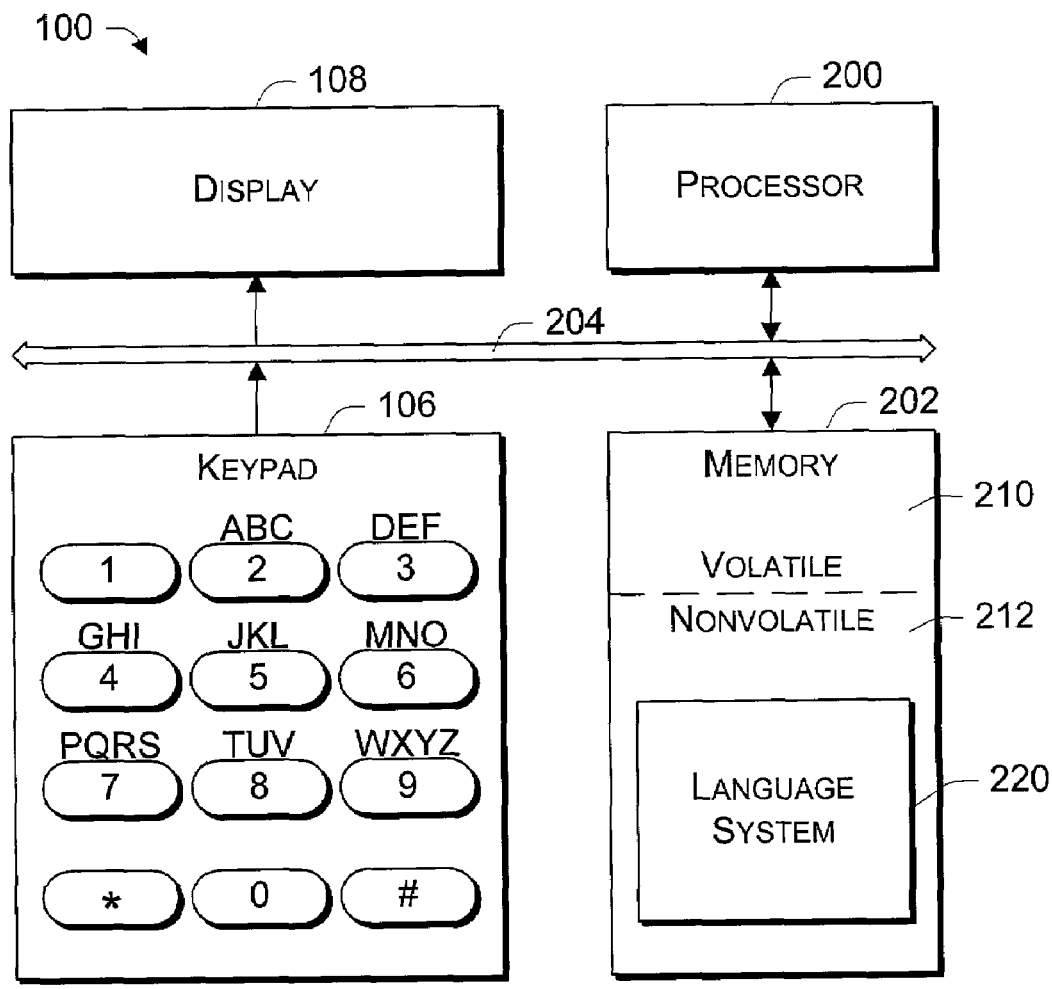
FIG. 2 is a block diagram of the mobile phone.

FIG. 2 shows the functional components of the phone 100. It includes a microprocessor 200, memory 202, display 108, and keypad 106. These components are interconnected via a bus 204. The memory 202 includes volatile memory 210 (e.g., RAM, DRAM) and nonvolatile memory 212 (e.g., ROM, EEPROM, Flash, etc.).

The mobile phone 100 is equipped with a language system 220, which is stored in nonvolatile memory 212 and executed on processor 200. The language system facilitates entry of phonetic characters using the keypad 106. Phonetic characters, such as Chinese Pinyin, enable users to enter a corresponding string of English characters. As one example, the user enters the Pinyin "ni" by entering the letters "N" and "I" via the keypad 106. Based on the phonetic-based input string (e.g., Pinyin), the language system 220 automatically selects the most probable language character (e.g., Hanzi) based on the context of the characters. This selection may be made without express mode switching between input and selection.

Language System

Figure 3:
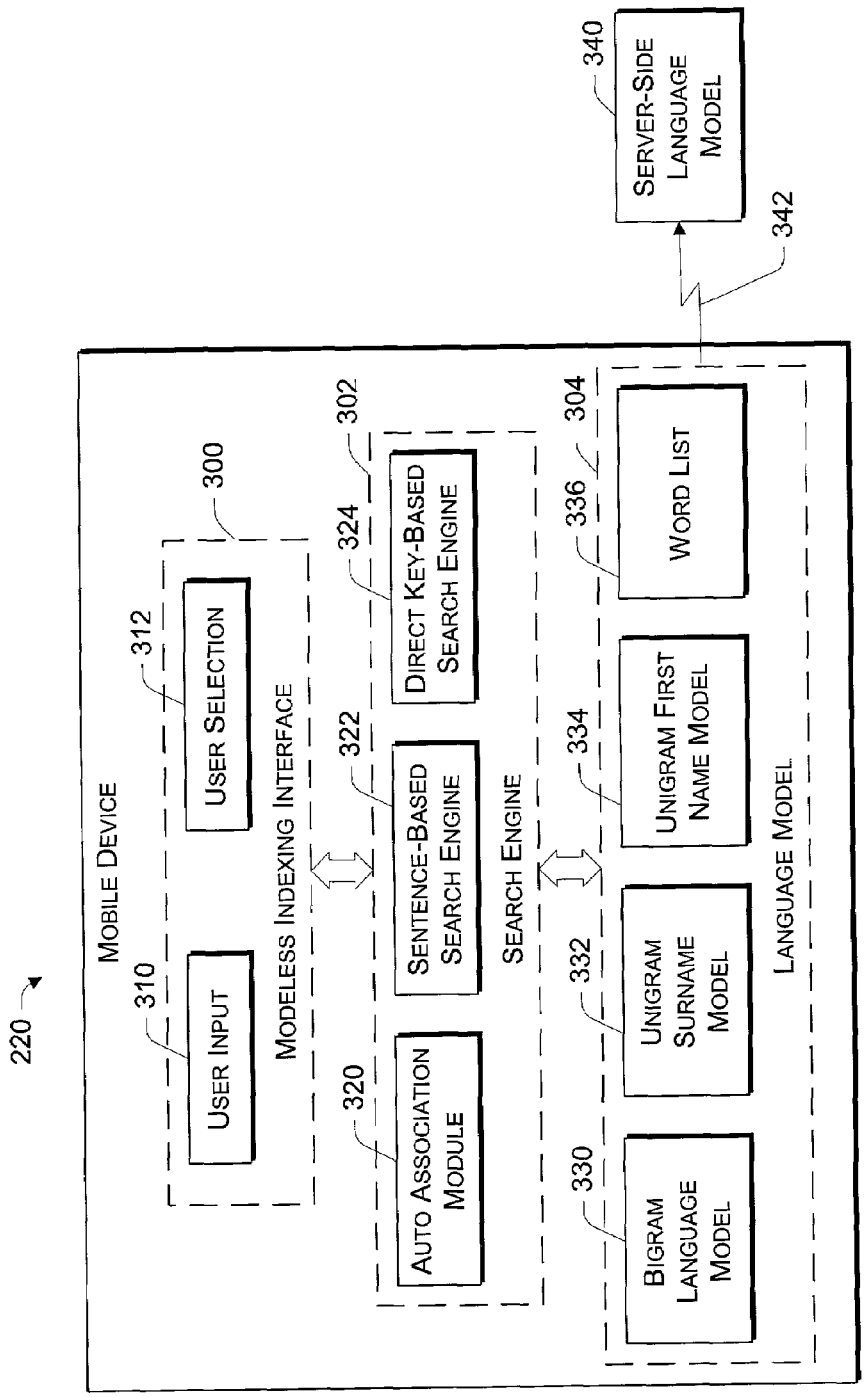
FIG. 3 is a block diagram of the language system implemented in the mobile phone.

FIG. 3 shows a language system 220 that can be implemented by a mobile device, such as phone 100. The language system 220 includes a modeless indexing interface 300, a search engine 302, and a language model 304.

The modeless indexing interface 300 facilitates seamless entry of phonetic characters and selection of converted language text. As the user enters letters via the keypad 106, the modeless indexing interface 300 dynamically adjusts the keys to be used either as "input" keys to allow further input of additional phonetic characters or "selection" keys that allow user confirmation of possible converted language characters. The modeless indexing interface 300 includes a user input interface 310 and a user selection interface 312 to differentiate between the user's input of an additional phonetic text and the user's confirmation of an intended converted language character. With the interface, however, the user need not select a separate mode switching key, allowing integrated entry and selection functions.

The search engine 302 receives the input string from the modeless indexing interface 300 and attempts to identify the most probable language characters given the input string. The search engine includes an auto association module 320 to automatically anticipate possible language characters after the user enters a partial input string. The search engine 302 also includes a sentence-based search engine 322 to discern possible language characters in view of the context of previously entered phonetic text. The sentence-based search engine 322 tracks phonetic characters as they are entered to glean the user's intentions as to probable language characters. The search engine 302 further includes a direct key-based search engine 324 to search for possible language characters directly based on key input, rather than on the phonetic characters represented by the key input.

The search engine 302 passes the input string to the language model 304, which derives possible language characters based on the input string. The language model 304 includes a character-based bigram language model 330 to convert the phonetic character(s) to language character(s). In the context of Chinese, for a given Pinyin input P, the goal is to find the most probable Chinese character H, so as to maximize the probability Pr(H).

In a bigram model, if a sentence is composed of words $W_1, W_2, \ldots W_n$, the probability Pr(H) is as follows:

$$Pr(H)=Pr(W_1 W_2 \ldots W_n) \approx Pr(W_1)*Pr(W_2|W_1)*Pr(W_3|W_2)* \ldots *Pr(W_n|W_{n-1})$$

Porting this to the mobile phone input context, for a given keypad input D, the goal is to find the most probable Chinese character H, so as to maximize the probability Pr(H|D).

$$Pr(H|D)=Pr(H|P)Pr(P|D)$$

where P is the possible syllable mapped to the input digits D.

The language model 304 may also include a unigram surname model 332 and a unigram first name model 334 that attempt to identify the most likely surnames and first names for a given phonetic word. The language model may optionally include a word list 336 that is a continuous tally of most frequently used words. The word list might alternatively (or additionally) include Chinese characters that are added when entered by the user. If only Chinese characters reside in the word list 336, word information can be obtained from the bigram model. The tradeoff between including words or characters in the word list depends in part on system and implementation requirements, such as the amount of memory available for the word list. If memory costs are low, a combination of word information and characters will improve entry speed.

The language model 304 described above resides on the mobile device. The language system 220 may further include a server-side language model 340. With this architecture, the device-based language model 304 may implement a small language model is used to help a user input Chinese characters without time delay. However, due to processing and memory limitations, the size of the language model is limited. The server is not limited in this way, and hence can implement powerful language models, such as N-gram language models that produce more precise results. If there is sufficient bandwidth, the mobile device may transmit the input string to the server side language model 340 via link 342 and allow the server to process the input.

Modeless Indexing

The modeless indexing interface 300 of the language system 220 supports a modeless entry methodology that eliminates conventional mode switching between input and selection operations. With conventional systems, the keypad of a mobile phone is used for two functions: input and selection. As the user presses keys, the conventional system attempts to identify the intended character. Possible candidate characters are indexed using digits 1-9. But the conventional system cannot automatically distinguish whether the user intends to select one of the candidates, or enter another letter. For example, suppose a user enters the sequence "64". The system suggests the following candidate characters in association with a corresponding key:

1米2. 你3. 民4 明5. 命6 名7 您8 宁9.灭

If the user then enters "6" to yield an input string of "646", the conventional system will be confused because "6" can be either the selection of 名 or the input of "646" ("min" or "nin"). To distinguish, conventional mobile phones are equipped with a mode switch to permit switching between input and selection. If the user desires to select 名 the user presses the mode switch from input to selection and then presses the "6" key. Alternatively, if the user wants to input another character, the user leaves the phone in the input mode and presses the "6" key. Unfortunately, this mode switching is burdensome and confusing to the user.

Figure 4:
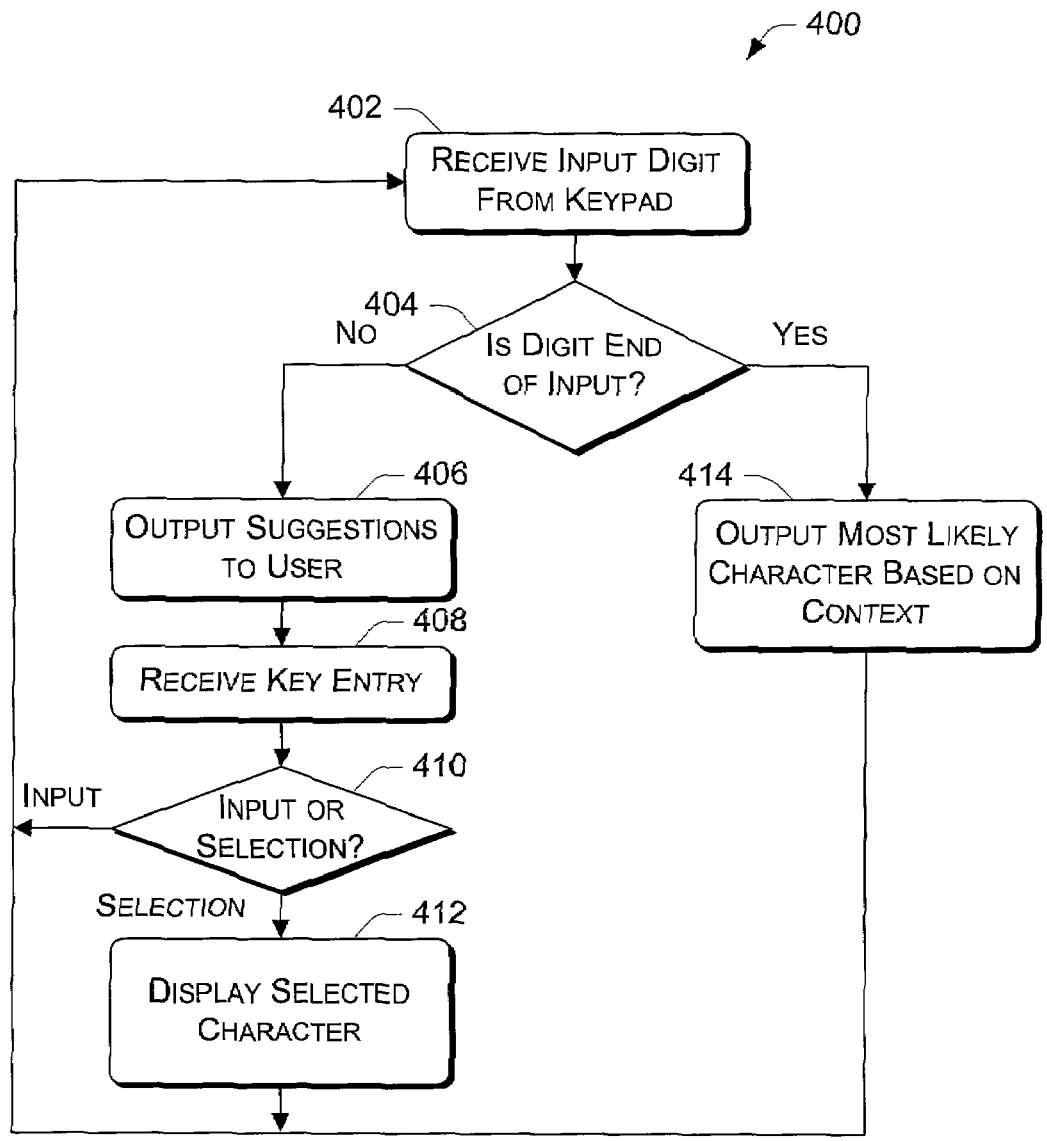
FIG. 4 is a flow diagram of a process for inputting language characters into the mobile phone.

The modeless indexing interface 300 eliminates this problem by implementing a modeless entry process. FIG. 4 shows the modeless entry process 400. This process may be embodied as computer executable instructions that, when executed, perform the operations illustrated in FIG. 4. The process 400 will be described with additional reference to FIGS. 1-3.

At block 402, the user input interface 310 permits a user to enter phonetic text via keypad 106. As the user presses discrete keys, the interface 300 receives the key input and passes it onto the search engine 302 and language model 304 to begin processing the input string and discern what language character or word the user is attempting to enter. The numbers and/or corresponding phonetic text may also be displayed on the display 108 as the user enters them. For instance, if the user enters "6" followed by "4", the mobile phone may depict the number series "64" or a possible corresponding phonetic text, such as Pinyin "mi" or "ni".

At block 404, the language system determines whether the last entered digit might possibly be the end of the input string. Assuming it is not (i.e., the "no" branch from block 404), the mobile phone presents possible language characters returned from the search engine 302 and language model 304 (block 406). The available choices are indexed by specifically chosen keys that represent letters of the alphabet that do not follow the phonetic characters already entered. Continuing the above example, after the user enters "64", keys "1, 4, 5, 7, 9" are chosen as "selection" keys because the letters associated with digits 4 (GHI), 5 is (JKL), and 7 (PQRS) (note that digits 1 and 9 do not have any associated letters) would not follow a Pinyin string of "mi" or "ni".

Thus, the possible candidates are assigned to the selections and displayed as follows:

1 你4. 米5. 年7 密9.尼

The most probable candidate is assigned to the first available index key, the second most likely candidate is assigned to the second available index key, and so on. If the user sees a word that he/she wants to input, the user can directly press any one of the keys 1, 4, 5, 7, and 9 for immediate selection of the corresponding Chinese character. The remaining numbers 2, 3, 6, and 8 continue being "input" keys because they correspond to phonetic characters that still might be entered. For example, following entry of "64", the user may be intending to enter the Pinyin text "min" or "nin". Thus, adding the next digit "6" to form a three digit input of "646" will result in inputting additional phonetic text rather than selection of a converted character.

It is noted that there may be more candidate language characters than can be displayed at any one time. For instance, the search engine and language model may return more than five possible language characters given the input "64". If the user desires to see more candidates, the user may activate the scroll up/down control key (see FIG. 1) to have other candidates displayed. In one implementation, actuation of the scroll control key causes a transition to selection mode, meaning that the next key input will be a selection. As a result, the language system can output up to nine possible candidates with each scroll actuations, using digits 1-9. Since the system assumes the user is making a selection, the limited index is not used once the scroll is activated.

At block 408, the modeless indexing interface 300 receives the next key entry. At block 410, the interface 300 determines whether the key represents an input or selection. In this example, entry of keys 1, 4, 5, 7, and 9 represent a selection and keys 2, 3, 5, and 8 represent an input. If the user presses an input key (i.e., the "input" branch from block 410), the interface 300 receives the new input and adds it to the existing string (block 402). Alternatively, if the user presses a selection key (i.e., the "selection" branch from block 410), the interface 300 displays the selected language character. For instance, if the user presses the "4" key, the corresponding character 米 will be displayed.

With reference again to block 404, if the digit is the final input of the sequence (i.e., the "yes" branch from block 404), the language system outputs the most likely character based on the context (block 414). The search engine 302 uses the surrounding words in the sentence and statistically derives the most likely character based on the user's input and the contextual words.

Accordingly, depending upon the user's input, the modeless indexing interface 300 dynamically adjusts which keys are used to indexed possible language characters and which keys are used to receive further phonetic text. The interface is thus able to differentiate between the user's input of an additional phonetic text and the user's confirmation of an intended converted language character. With this interface, the user need not select a separate mode switching key, thereby seamlessly integrating input and selection. This removes the confusion inherent in conventional systems and significantly reduces the number of keystrokes and entry time.

Direct Selection

The language system 220 also permits direct searching of possible candidates based on the key input, rather than conversion from the phonetic text represented by the key input. In conventional mobile devices, to input one English letter, a user typically presses a key 1-4 times to identify a particular letter. For example, pressing the "6" key twice, or "66", correlates to entry of the letter "n". However, this input method becomes somewhat burdensome when entering strings of characters, such as phonetic text. For example, to enter the Pinyin "ni", a user must type the following sequence "66444".

To reduce the number of keystrokes, the direct key-based search engine 324 of the language system 220 searches for possible language characters (e.g., Hanzi characters) based directly on key input, rather than based on the phonetic text (e.g., Pinyin) corresponding to multiple key entries. As an example, to input 你 the user enters the shortened key sequence "64" (rather than the long sequence "66444") and the search engine 302 searches for possible Hanzi characters that correspond directly to the key sequence "64". The system will also search all possible characters whose Pinyin can be represented by "64", such as chars whose Pinyin is "ni" or "mi".

The direct key-based search engine 324 is trained over time on the user's input habits and patterns to begin developing statistical characteristics related directly to the key input sequence. Over time, as a user enters a certain sequence that he/she has entered before, the direct key-based search engine 324 can ascertain the most likely language characters based on the input sequence.

In one implementation, a character-based language model is applied to find the most possible Chinese character which responding to the input digit strings, as follows:

$$Pr(H|D)=Pr(H|P)Pr(P|D)$$

where H is the Chinese Hanzi, P is the Chinese Pinyin, and D is the input digits.

While the key-to-character conversion introduces more uncertainty, it beneficially saves the user numerous keystrokes. Instead of having to enter "66444" for "ni", the user might simply enter "64" before being presented with possible Hanzi characters.

Auto-Association

To further reduce the number of keystrokes, the search engine 302 employs an auto association module 320 that automatically suggests possible language characters before a user finishes entering a full phonetic string. For example, suppose a user types the string "640" to obtain the Hanzi character 你 and the string "636" to produce the Hanzi character 们 Furthermore, assume that the language system has statistically determined that this user, over time, is more likely intending to enter the Hanzi character 们 than the Hanzi character 你 when entering the string beginning "6". Thus, when a user begins typing "6", the auto association module 320 identifies that the Hanzi character 们 as the most likely candidate and displays this character for possible selection (e.g., indexing the character with the "1" key) before the user enters the additional number sequence.

If the language system accurately predicts the intended character, the user can simply select the suggested Hanzi character. Alternatively, if the suggestion is not what the user intends (e.g., the user intends to enter the Hanzi character 你 the user can continue to press keys to further define the phonetic input (e.g., enters the sequence "64"). At this junction, the auto association module 320 may suggest other possible candidates based on the 2-digit sequence.

Automatic Selection Based on Context

The language system 220 employs a sentence-based search engine 322. Conventional mobile phones employ more limited word-based search engines, which are incapable of automatically making decisions as to possible words in the sentence. By employing a sentence-based search engine 322, the language system 220 is able to consider the context of the sentence when statistically deriving the most possible language characters.

The search engine utilizes an N-gram language model to derive likely candidates by evaluating the input string in view of one or more neighboring words. In the described implementation, a bigram language model is used. The bigram language model evaluates a current input in view of the preceding word. Larger language models may be used (e.g., trigram) if resources permit.

This context-based statistical analysis is often more accurate than the single word-based search engines and can be used to automatically select the most probable language character. A user's interaction confirming or denying the automatic selection can also be used to adjust the statistical analysis, thereby improving the accuracy of the system's decision.

When the user does not find the desired Chinese characters in the candidate list, he/she can hand over the selection to the search engine. The search engine will choose the most possible words based on the context. For example, the function of key '0' on the keypad can be defined as a search initiation button to hand over the selection job to the search engine. If the user wants to input 喜欢 he/she simply types "9404826" followed by the search initiation key "0" and the system automatically outputs 喜欢 There is no direct interaction between the user and the search engine.

Client-Server System

The language system 220 described above employs a resident language model 304 to offer contextual statistics that are useful in anticipating the characters intended by the user. To further improve the accuracy of selecting possible language characters, the language system 220 may employ a more powerful language model that does not reside on the mobile device. As shown in FIG. 3, the language system 220 may include a nonresident language model 340 implemented at a remote server that is communicatively coupled to the mobile device.

With this architecture, the mobile device functions as an input module to receive the user's input string of numbers (or phonetic text). The language model may then transmit this input to the server-side language model 340 via link 342. The input string may be sent over is its raw form, or following some local processing by the resident language model 304. The nonresident language model 340 can then perform more powerful statistical analysis to derive possible language characters. The statistical results, or a list of language characters (ranked or unranked), may be returned to the mobile device for presentation to the user. If there is sufficient bandwidth, the mobile device and server can be synchronized and the system will automatically learn and adapt to the user.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A mobile device, comprising:
 a keypad to receive an input string representative of one or more Chinese phonetic characters, wherein the keypad comprises number keys, the number keys having associated letters of an alphabet;

a language system to receive the input string entered via the keypad and to generate likely Chinese language characters based on the input string;

a language model to derive likely Chinese language characters based on the input string; and a processor operative with the keypad and a memory to seamlessly support at least the following modes:
  presentation of the likely Chinese language characters on a display;
  selection of the likely Chinese language characters; and/or
  further input of one or more Chinese phonetic characters on the keypad;
  wherein the phonetic characters are Chinese Pinyin and the language characters are Chinese Hanzi.

2. A mobile device, comprising:

a keypad to receive an input string representative of one or more Chinese phonetic characters, wherein the keypad comprises number keys, the number keys having associated letters of an alphabet;

a language system to receive the input string entered via the keypad and to generate likely Chinese language characters based on the input string;

a language model to derive likely Chinese language characters based on the input string; and a processor operative with the keypad and a memory to seamlessly support at least the following modes:
  presentation of the likely Chinese language characters on a display;
  selection of the likely Chinese language characters; and/or
  further input of one or more Chinese phonetic characters on the keypad;

wherein the language system includes a character-based bigram language model and a word-based N-gram language model, where N>2.

3. A mobile device, comprising:

a keypad to receive an input string representative of one or more Chinese phonetic characters, wherein the keypad comprises number keys, the number keys having associated letters of an alphabet;

a language system to receive the input string entered via the keypad and to generate likely Chinese language characters based on the input string;

a language model to derive likely Chinese language characters based on the input string; and a processor operative with the keypad and a memory to seamlessly support at least the following modes:
  presentation of the likely Chinese language characters on a display;
  selection of the likely Chinese language characters; and/or
  further input of one or more Chinese phonetic characters on the keypad;

wherein the language system comprises:
a first name model to detect first names in the input string;
a surname model to detect surnames in the input string; and
a character-based bigram language model.

4. A system comprising:

a keypad to receive an input string representative of Chinese phonetic characters, wherein the keypad comprises number keys, the number keys having associated letters of an alphabet;

a search engine to identify the likely Chinese language characters;

a resident language model residing on a mobile device to convert Chinese phonetic characters input received from the keypad into likely Chinese language characters using a first statistical language model; and a nonresident language model residing on a server remote from the mobile device, the nonresident language model being configured to convert the Chinese phonetic characters into the likely Chinese language characters using a second statistical language model; and a processor operative with the keypad and a memory to seamlessly support at least the following modes:
  presentation of the likely Chinese language characters on a display;
  selection of the likely Chinese language characters; and/or
  refusal of the likely Chinese language characters;

wherein the first statistical language model is a character-based bigram language model and the second statistical language model is a word-based N-gram language model, where N>2.

5. One or more computer-readable media having stored thereon a plurality of instructions that, when executed by one or more processors of a computer, causes the one or more processors to perform acts including:

receiving an input string entered via a numeric-based keypad where number keys in the keypad have associated letters in an alphabet, the input string being representative of one or more Chinese phonetic characters;

generating possible Chinese language characters based on the input string;

converting the input string of one or more Chinese phonetic characters to possible Chinese language characters that are not part of the alphabet;

presenting the possible Chinese language characters using an index that associates selection keys of the keypad with the Chinese language characters, the selection keys being chosen based on whether the letters associated with the selection keys are likely to follow the one or more Chinese phonetic characters already entered; and seamlessly supporting at least the following modes:
  displaying the possible Chinese language characters;
  selecting the possible Chinese language characters; and/or
  further inputting one or more Chinese phonetic characters;

wherein the phonetic characters are Chinese Pinyin and the language characters are Chinese Hanzi.

6. A mobile device, comprising:

a keypad to receive an input string representative of one or more Chinese phonetic characters, wherein the keypad comprises number keys, the number keys having associated letters of an alphabet;

a language system to receive the input string of letters from the alphabet entered via associated number keys of the keypad, and to generate likely Chinese language characters based on the input string;

a language model to derive likely Chinese language characters based on the input string; and a display to present the likely Chinese language characters for user selection;

wherein the language system includes a character-based bigram language model and a word-based N-gram language model, where N>2.

* * * * *